Feb. 26, 1952 J. S. ROBBINS 2,587,065
CUTTING TOOL MOUNTING
Filed March 25, 1950 2 SHEETS—SHEET 1
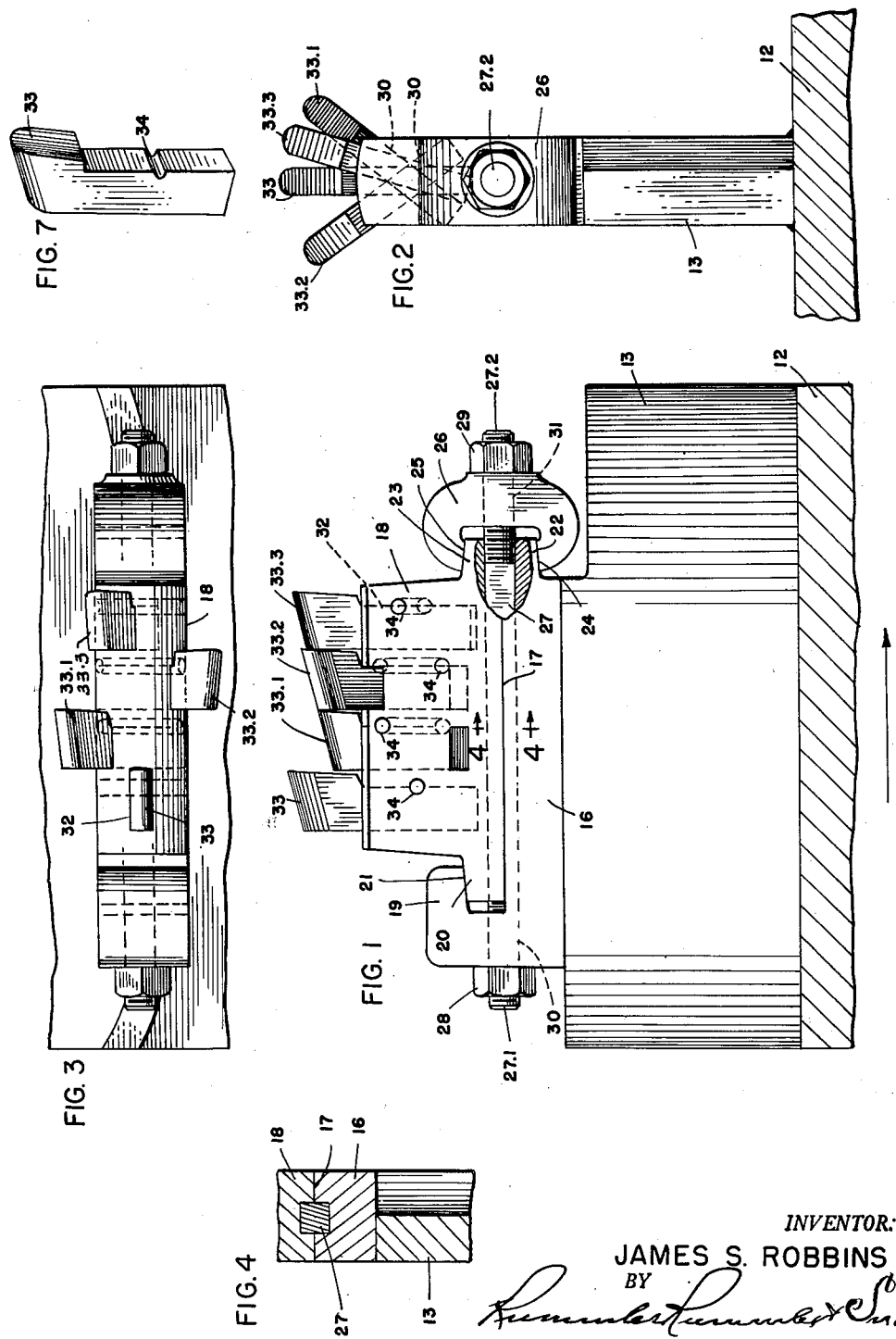
INVENTOR:
JAMES S. ROBBINS
BY
ATT'YS Feb. 26, 1952 J. S. ROBBINS 2,587,065
CUTTING TOOL MOUNTING
Filed March 25, 1950 2 SHEETS—SHEET 2
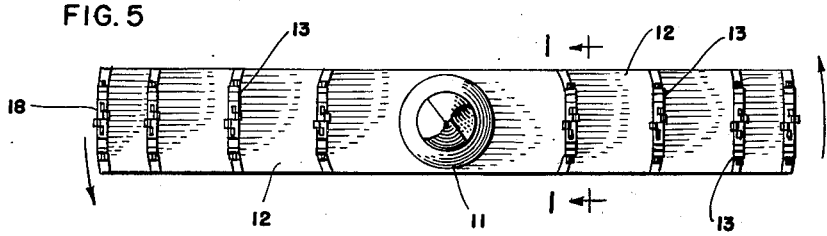
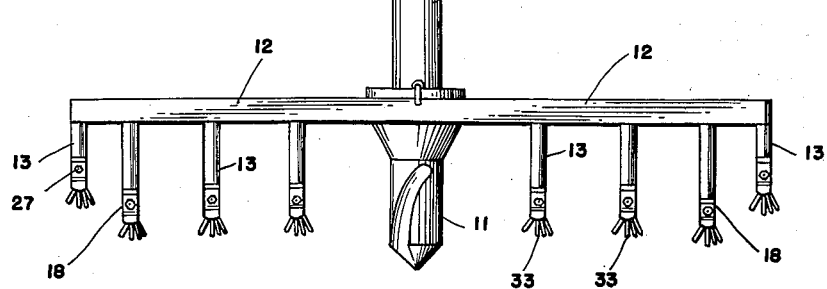
INVENTOR:
JAMES S. ROBBINS Patented Feb. 26, 1952

2,587,065

UNITED STATES PATENT OFFICE 2,587,065

CUTTING TOOL MOUNTING

James S. Robbins, Highland Park, Ill.

Application March 25, 1950, Serial No. 151,851

5 Claims. (Cl. 262—33)

This invention relates to cutter mountings in the nature of tool chucks, particularly such as have application to friable rock cutting, in coal mining, comprising cutting narrow kerfs in the face of the rock and then breaking down the intervening cores.

The main objects of this invention are to provide an improved form of chuck and mounting therefor for removably holding rock cutting bits; to provide a chuck mounting of this kind in which a plurality of cutting bits are held in position for cutting an elongated narrow kerf in a rock face and in which the chuck and its mounting are of minimum width and adapted to enter the kerfs without offering obstruction to the advance of the rock cutting machine; and to provide a chuck mounting adapted for this purpose that is extremely simple and simultaneously locks the chuck against any movement relative to its carrier.

A specific embodiment of this invention is shown in the accompanying drawings in which:

Figure 1 is a side elevation of the improved chuck and its mounting as it would appear when viewed from the line 1—1 of Fig. 5.

Fig. 2 is an end elevation of the same.

Fig. 3 is a top plan.

Fig. 4 is a fragmentary sectional detail taken on the line 4—4 of Fig. 1.

Figs. 5 and 6 are respectively a front elevation and top plan of a portion of one of the rock cutting tool carriers of a well-known form of tunneling machine to which the present invention is particularly capable of being applied.

In the form shown in the drawings, the tool mounting of the present invention is designed for use in a rock tunneling machine in which there is a central shaft 10 having a rock-boring pilot bit 11 at its front end and having rearward of that pilot bit a plurality of radial carrier arms 12 on which are mounted a plurality of forwardly directed blade-like fins 13 which lie generally parallel to the axis of the shaft 10 and are spaced radially therefrom at different distances so as to cut a plurality of circular kerfs in an opposed rock face, which kerfs are concentric with each other and with the pilot bit 11.

The mining machine has one or more of such shafts 10 and is represented in the drawings by the bearing 14 and a fragment of the frame 15 which may be in the form of a tractor on which the shaft 10 is mounted in a horizontal position and which is equipped with suitable power for rotating the shaft 10 and advancing the machine as a whole in the direction in which the pilot bit 11 points.

Each fin 13 is preferably narrow in a radial direction, long in an axial direction and quite wide in a tangent or circumferential direction with respect to its rotary movement so as to be capable of entering a narrow circular kerf in the face of the rock and still have sufficient strength to drive the cutting tools that are mounted at its front end.

As shown in Figs. 1, 2 and 3, the tool mounting comprises a base member 16 that is integrally attached as by welding at the outer end of its carrier fin 13 and is long and narrow in the direction of its movement as determined by the rotation of the carrier arms 12. The member 16 has a straight planar upper surface 17 that serves as a seat for a removable tool-holding member or chuck block 18.

At one end of the surface 17 the base member 16 has a fixed clamp jaw 19 in the form of a hook positioned to overhang the seat 17 and receive an end flange 20 that extends outward from the block 18 along the seat 17 in wedging engagement as determined by the inclined surfaces represented by the line 21.

Both the base member 16 and the chuck block 18 have end flanges 22 and 23 respectively at their opposite end, adjacent the seat 17 and having inclined surfaces 24 and 25 for wedging engagement with the jaws of a C-clamp 26. The bottom surface of the chuck block 18 and the seat 17 of the base member 16 are channeled lengthwise to form registering keyways to receive a bolt 27 which serves as a locking key to secure the bottom member 16 and the chuck block 18 against relative lateral movement. This bolt 27 is preferably rectangular or flat sided in cross section, so as to snugly fit the keyways in the chuck block and base member, and is of circular cross section and threaded adjacent to its ends to receive the clamping nuts 28 and 29.

The threaded end 27.1 of the bolt 27 passes through a bore 30 in the neck of the stationary clamp jaw 19 and the threaded end 27.2 of the bolt 27 passes through a bore 31 in the C-clamp member 26. Thus when the nuts are in place and in position to exert pressure on the C-clamp, the chuck will be tightly wedged against the seat 17 and secured against any posibility of play either longitudinally or transversely by means of the single bolt 27.

The chuck block 18 has in its front end, with reference to Fig. 1, a plurality of sockets 32 for receiving the shanks of bits and supporting them at different angles, as shown in Fig. 2. The bits have identical shanks and the sockets 32 are identical except that they are inclined at different angles with respect to the fins 13.

In the form shown, the bit 33 is vertical and the bits 33.1 and 33.2 are equally inclined in opposite directions from the plane of the travel of the bit 33 and the bit 33.3 is positioned at an angle at one side of the bit 33 and midway between bit 33 and one of the bits 33.1.

The shanks of the cutter bits are identical in shape so that their sockets may be of like dimensions and each shank has a transverse keyway for receiving a cotter pin 34 driven through a corresponding keyway in the respective socket 30. The keyways in the sockets 30 are directed at right angles to the longitudinal axes of the sockets.

In order that the intermediately inclined cutter 33.3 in one chuck will be inclined toward one side and the cutter 33.3 in the succeeding chuck following the same path will be inclined toward the other side of the middle cutter 33, the chuck 18 on one of the arms 12 and the corresponding chuck 18 on the other arm 12 are made right and left of each other. Thus in the rotation of the shaft 10 complete removal of the rock material in the kerf will occur. It is apparent that the only difference between the right and left chucks may be in the location of the respective cotter bores, since the inclination of the socket of the cutter 33.3 to one side or the other of the middle cutter 33 may be accomplished by turning the chuck end for end. To this end the end flanges 20 and 23 on the chuck block are identical.

Although but one specific embodiment of this invention is herein shown and described, it will be understood that numerous details of the construction shown may be altered or omitted without departing from the spirit of the invention as defined by the following claims.

I claim:

1. In a rock cutting machine, a chuck block having bit-shank sockets extending transversely into its front face thereof and having a planar base surface on its rear face, a base member having a planar seat for said base surface, a fixed hook on one end of said base member overlying said seat, a flange on the other end of said base member adjacent said seat, a pair of flanges extending respectively from opposite ends of said chuck block, one for engaging said hook and the other for overlying said base member flange, a C-clamp engaging said overlying flanges, said base member and chuck block having registering channels extending along said seat between said hook and C-clamp to form a keyway, and a bolt fitting said keyway and adjustably connecting said hook and C-clamp, said hook and C-clamp having wedging engagement with the flanges on said chuck block for locking said chuck block to said base member.

2. In a rock cutting machine, the combination of a shaft, a pilot bit at one end thereof, a carrier arm extending radially from said shaft in a position rearward of said pilot bit, a fin on said arm extending forward in parallel relation to said pilot bit, a tool mounting base member rigid on said fin, being elongated in the direction of the path of said fin about the axis of said shaft and having a planar seat parallel to the plane of rotation of said carrier arm, a fixed hook on one end of said base member overlying said seat, a flange on the other end of said base member adjacent said seat, a chuck block having a planar surface adapted to rest on said seat, a pair of flanges extending respectively from opposite ends of said chuck block, one for engaging said hook and the other for overlying said base member flange, a C-clamp engaging said overlying flanges, said base member and chuck block having registering channels extending along said seat between said hook and C-clamp to form a keyway, and a bolt fitting said keyway and adjustably connecting said hook and C-clamp, said hook and C-clamp having wedging engagement with the flanges on said chuck block for locking said chuck block to said base member.

3. The combination of claim 2, characterized by having the chuck block equipped with variously inclined tool sockets and with identically shaped flanges on its opposite ends, whereby the same is reversible, end for end, on said seat for relative right and left disposition of the tool sockets.

4. In a rock cutting machine, the combination of carrier means mounted to travel in an endless path for cutting a kerf in a rock mass, and a tool mounting comprising a base member fixed on said carrier means and elongated in the direction of travel thereof along said endless path, said base member having a planar seat for a tool chuck, a fixed hook on one end of said base member overhanging the plane of said seat, a flange on the other end of said member directed along and parallel with said seat, a chuck block having a planar surface adapted to rest against said seat, a pair of flanges extending parallel to said seat on respectively opposite ends of said chuck block, one positioned to engage said hook and the other to overlie said base member flange, a C-clamp engaging said overlying flanges, said base member and chuck block having registering channels to form a keyway extending along said seat between said hook and C-clamp, and a bolt fitting said keyway and adjustably connecting said hook and C-clamp, said hook and C-clamp having wedging engagement with the flanges on said chuck block for locking said chuck block to said base member.

5. In a rock cutting machine, a tool-holding member having a planar base surface, a base member having a planar seat for said base surface, a fixed hook on one end of one of said members overlying said seat, a flange on the other end of such one member directed away from said seat, a pair of flanges extending respectively in opposite directions from the other said member, one such flange being in position for engaging said hook and the other such flange in position to overlie said flange on said one member, a C-clamp engaging said overlying flanges, said members having registering channels extending along said seat between said hook and C-clamp to form a keyway, and a bolt fitting said keyway and adjustably connecting said hook and C-clamp, said hook and C-clamp having wedging engagement with the respective flanges for locking said members together.

JAMES S. ROBBINS.

REFERENCES CITED

The following references are of record in the file of this patent:

UNITED STATES PATENTS

| Number | Name | Date |
| --- | --- | --- |
| 318,962 | Crump et al. | June 2, 1885 |
| 623,574 | Smith et al. | Apr. 25, 1899 |
| 783,762 | Starl | Feb. 28, 1905 |
| 1,174,638 | Taylor | Mar. 7, 1916 |
| 1,427,629 | Phillips | Aug. 29, 1922 |
| 2,487,225 | Dunne | Nov. 8, 1949 |